United States Patent [19]
Iino

[11] Patent Number: 5,172,100
[45] Date of Patent: Dec. 15, 1992

[54] AUTOMOTIVE DISPLAY APPARATUS

[75] Inventor: Tadashi Iino, Susono, Japan

[73] Assignee: Yazaki Corporation, Tokyo, Japan

[21] Appl. No.: 700,970

[22] Filed: May 16, 1991

[30] Foreign Application Priority Data

May 17, 1990 [JP] Japan ................. 2-50744[U]

[51] Int. Cl.$^5$ .............................................. G02B 17/04
[52] U.S. Cl. .................................... 340/705; 359/630; 359/640; 359/837
[58] Field of Search ........................ 340/705, 980, 790; 353/13, 14; 359/629, 630, 638, 640, 831, 833, 836, 837

[56] References Cited

U.S. PATENT DOCUMENTS

| | | | |
|---|---|---|---|
| 3,722,459 | 3/1973 | Kisselmann et al. | 353/14 |
| 4,042,957 | 8/1977 | Ellis | 359/630 |
| 4,961,625 | 10/1990 | Wood et al. | 359/630 |
| 4,986,631 | 1/1991 | Aoki et al. | 359/833 |
| 5,013,134 | 5/1991 | Smith | 359/630 |

FOREIGN PATENT DOCUMENTS 2240855  8/1991  United Kingdom .

Primary Examiner—Alvin E. Oberley
Assistant Examiner—Kara Farnandez
Attorney, Agent, or Firm—Armstrong & Kubovcik

[57] ABSTRACT

A prism is installed at a lower part of the windshield near the dashboard with a first surface of the prism directed toward a viewing point of a driver and a second surface held in contact with the inner side of the windshield. The first or second surface of the prism is made a reflecting surface. The third surface is formed with a dark paint layer. The apex of the prism where the first and second surfaces join is tilted toward the driver seat in such a manner that the second surface becomes a total reflection surface for light from the third surface with respect to the viewing point of a driver. The display image of an indicator installed in the dashboard below the prism is reflected either by the first or second reflecting surface of the prism toward the driver's viewing point. Light from the dark third surface of the prism is totally reflected by the second surface toward the driver to provide a dark background for the display, enhancing the display contrast. The prism, when viewed from outside the windshield, appears transparent thus maintaining a good external view of the windshield.

7 Claims, 6 Drawing Sheets

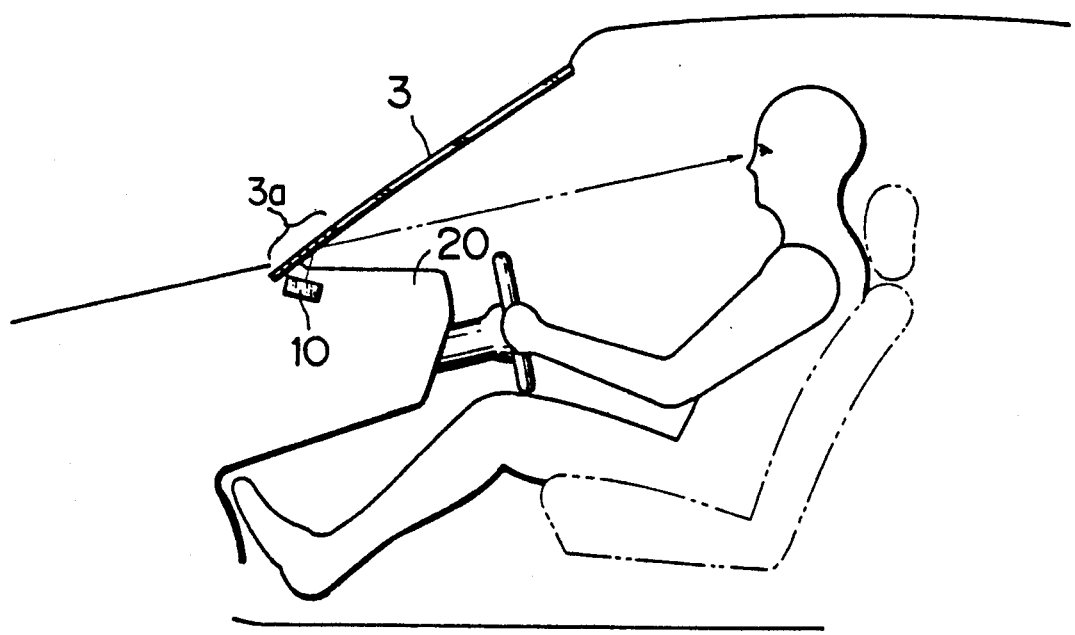

AUTOMOTIVE DISPLAY APPARATUS

BACKGROUND OF THE INVENTION

1. Field of the Invention

The present invention relates to an automotive display apparatus in which a display image of an indicator showing driving information such as vehicle speed is reflected by a part of the windshield near dashboard toward a driver so that the driver can see the driving information.

2. Prior Art

The apparatus of this kind that is currently in use is shown in FIG. 7. The display apparatus has an indicator 10, which shows the vehicle speed, installed in the dashboard 20 near the windshield 3. A dark reflecting portion 3a is formed on a part of the windshield 3 near the boundary with the dashboard 20. The display image of the indicator 10 is reflected by the reflecting portion 3a on the inner surface of the windshield 3 toward the driver's seat.

In this arrangement, the display appears against the dark background of the reflecting portion 3a within a viewing field of the windshield 3, thus forming a so-called head-up display that allows a driver to easily see the display without having to shifting his or her sight line greatly. Another advantage is that since the background of the display is dark, the display can be clearly seen with a good contrast. The reflecting portion 3a is formed either by a black ceramic paint 40 on the windshield 3, as shown in FIG. 8a, or by installing a black opaque film 40' between mating component glasses of the windshield 3.

In the conventional display apparatus mentioned above, however, the dark reflecting portion 3a can be noticed also from outside the vehicle and this mars the appearance of the car. Since the reflecting portion 3a is formed on the windshield 3, there are limitations on the manufacturing process and the maintenance work is difficult.

SUMMARY OF THE INVENTION

In an automotive display apparatus forming a head-up display in which the display image of an indicator is reflected toward the driver's seat by a part of the windshield near the dashboard, it is an object of this invention to provide an automotive display apparatus, which does not degrade the external appearance of the vehicle by a dark reflecting portion while assuring a good contrast of the display by a dark background.

To achieve the above objective, an automotive display apparatus of this invention comprises: an indicator installed in the dashboard with a display surface of the indicator facing up; and a prism having a first surface and a second surface joined at an apex of the prism cross section, either one of the first and second surfaces of the prism working as a reflection surface, said prism being installed at a lower part of a viewing field of the windshield near the dashboard in such a way that the prism apex is inclined toward the driver's seat side, a display image of the indicator being reflected by either one of the first and second surfaces of the prism toward the driver's seat side, said prism having a third surface provided with a dark plane, said second surface of the prism being made a total reflection surface for light from the third surface with respect to a viewing point on the driver seat side.

The working of the display apparatus of this invention may be briefly described as follows.

The display image of the indicator is reflected toward the driver seat side by the first or second surface of the prism located at the lower part of a viewing field of the windshield, so that the driver can see the display image of the indicator on the viewing field of the windshield near the dashboard. The dark plane is formed facing the third surface of the prism and the second surface is made a total reflection surface for light from the third surface with respect to a viewing point of the driver. Thus, when the driver looks at the first surface of the prism from the driver seat, the dark plane can be seen, totally reflected by the second surface, thus providing a dark background for the display image.

When viewed from outside the windshield, the prism appears transparent because a person sees, from outside, the second surface of the prism obliquely from a lower side opposite to the prism apex.

BRIEF DESCRIPTION OF THE DRAWINGS

FIG. 7 is a schematic diagram showing a conventional display apparatus in which the reflecting portion is formed at a lower part of the windshield.

PREFERRED EMBODIMENTS OF THE INVENTION

Figure 1:
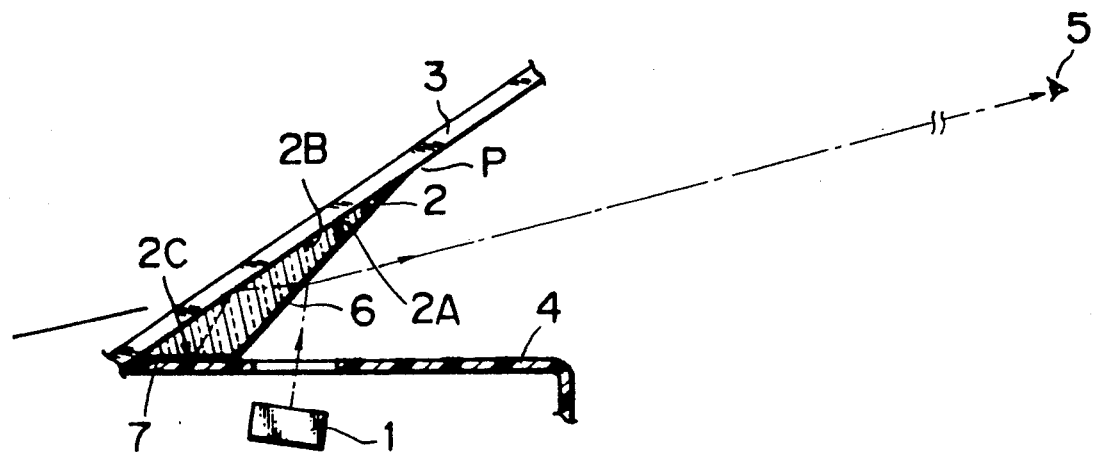
FIG. 1 is a schematic diagram showing an automotive display apparatus as a first embodiment of this invention.

FIG. 1 shows an automotive display apparatus as a first embodiment of this invention. In the figure, reference numeral 1 represents a self-illuminating indicator showing such information as a car speed. Denoted 2 is a prism made of transparent acrylics which is formed into a triangular pillar. Designated 3 is a windshield; 4 a dashboard; and 5 a viewing point of a driver. The indicator 1 may use a fluorescent tube, a light emitting diode and a backlighted liquid crystal display.

The indicator 1 is installed in the dashboard 4 with its display surface facing upward. The prism 2 is mounted on the dashboard 4 and has its first surface 2A directed toward the driver's seat and a second surface 2B held in contact with the inner side of the windshield 3 so that an apex P of the triangular cross section of the prism 2 where the two surfaces join inclines toward the driver's seat. The first surface 2A is formed with a vapor-deposited film 6 which works as a reflection surface with a reflectivity of some 20%. A third surface 2C is lined with a black paint layer 7.

The display light (radiating light of the display) from the indicator 1 is reflected by the first surface 2A of the prism 2 toward the viewing point 5 of the driver. When the driver looks from the viewing point 5 at the prism 2, he can see the display of the indicator 1 within the first surface 2A of the prism 2. This arrangement forms a so-called head-up display that allows the driver to see the display within a viewing field of the windshield 3.

Figure 2:
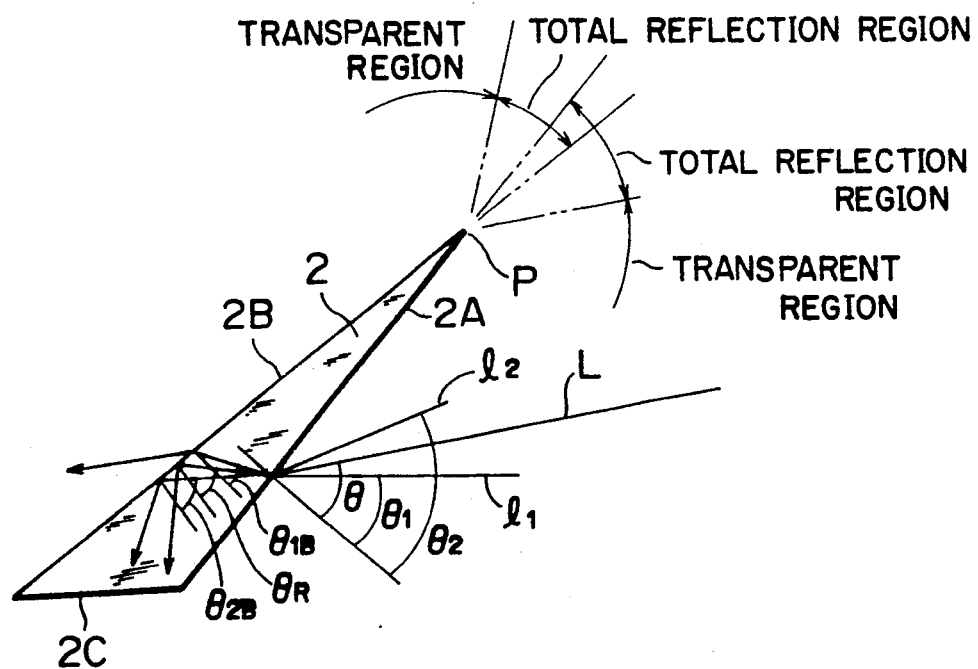
FIG. 2 is a schematic diagram showing the working of a prism employed in the embodiment.

FIG. 2 shows the action of the prism 2. Let us consider a reference ray of light L which, from the driver's seat side, enters the first surface 2A of the prism 2 at an incidence angle of $\theta$ and then strikes the second surface 2B at a critical incidence angle of $\theta_R$. Light $l_1$, whose incidence angle $\theta_1$ at the first surface 2A is smaller than that of light L, has an incidence angle $\theta_{1B}$ at the second surface 2B smaller than the critical angle $\theta_R$, so that the light passes from the second surface 2B into the windshield 3. Another light $l_2$, whose incidence angle $\theta_2$ at the first surface 2A is larger than that of the light L, has an incidence angle $\theta_{2B}$ second surface 2B larger than the critical angle $\theta_R$. As a result, the light $l_2$ is totally reflected toward the third surface 2C.

As can be seen by tracing back the locus of the light rays, when one looks at the prism 2 with a smaller incidence angle on the first surface 2A than the angle $\theta$, the prism 2 appears as a transparent member. When one views the prism at a larger incident angle, the third surface 2C is seen because it is totally reflected by the second surface 2B.

The angle of viewing the prism 2, therefore, can be divided along a sight line representing the incidence angle $\theta$ into two regions: a region where the prism 2 appears transparent (transparent region) and a region where it looks dark (total reflection region).

The viewing point 5 above the driver's seat is set at a position that makes the incidence angle on the first surface 2 larger than $\theta$. When one looks at the first surface 2A from this viewing point 5, he can see the black paint layer 7 through the third surface 2C. The display seen through the first surface 2A, therefore, has a dark background, which enhances the contrast of the display.

Now, let us consider how the prism 2 appears when viewed from outside the windshield 3. As can be seen from FIG. 2, the viewing angle for the second surface can be divided, as in the case of viewing from the driver's seat side, into a transparent region where the prism is seen as transparent and a total reflection region where it is seen as opaque. Since the apex P of the prism 2 is tilted toward the driver's seat, the sight line when one looks from normal height at the windshield 3 from the front of the car is included in the transparent region. That is, the prism 2 is seen as transparent when a person looks at it from outside the car. This display apparatus prevents the reflecting surface from marring the external appearance of the windshield, as experienced in the conventional apparatus.

In the above embodiment, the display image of the indicator 1 is reflected by the first surface 2A of the prism 2. By changing the inclination angle of the first surface 2A, it is possible to change the position of the indicator 1 in the dashboard 4, increasing the freedom of design. Furthermore, since the prism, which reflects the display image, is a separate member from the windshield 3, the manufacturing can be done without restrictions and maintenance performed with ease.

Figure 3:
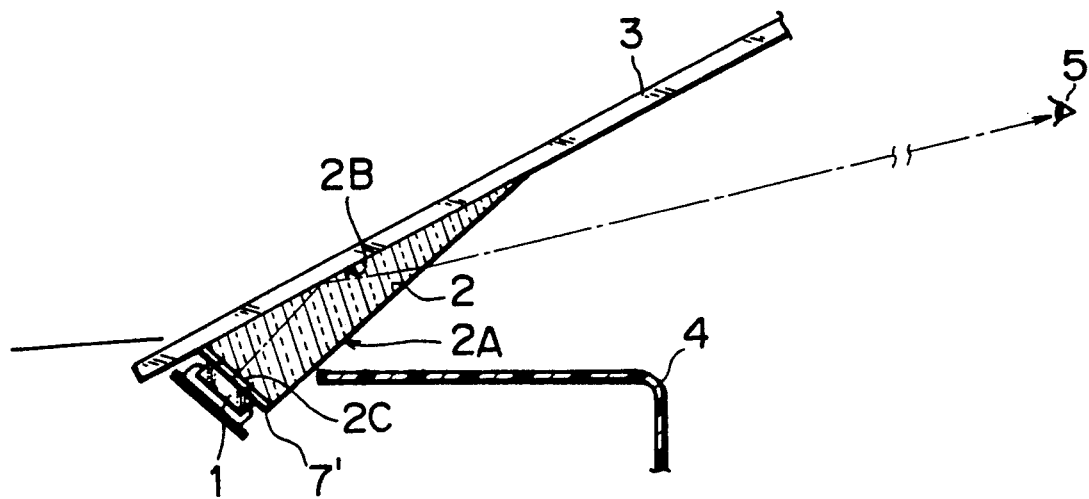
FIG. 3 is a schematic diagram showing an automotive display apparatus as a second embodiment of this invention.

FIG. 3 shows a second embodiment of the automotive display apparatus according to this invention. In the following embodiments, components identical with those of the first embodiment are given like reference numerals. In this second embodiment, an indicator 1 is installed directly facing a third surface 2C of the prism 2. A black paint layer 7' on the third surface 2C is formed only in an area other than the display pattern of the indicator 1 and positioned to line the third surface 2C of the prism 2. The display surface of the indicator 1 is put in contact with the paint layer 7', The positional relationship between the viewing point 5 and the prism 2 is the same as that of the first embodiment. The second surface 2B forms a total reflection surface for the viewing point 5. Thus, when one looks at the first surface 2A from the viewing point 5, the display image of the indicator 1 reflected by the second surface 2B can be seen, with the paint layer 7' providing a dark background covering the whole area of display image except the display pattern.

The prism 2 becomes transparent when viewed from outside the car, as in the first embodiment, thus maintaining a good external appearance of the windshield. Since the prism 2 is a separate member from the windshield 3, the manufacturing can be done without restrictions and maintenance performed easily.

Figure 4:
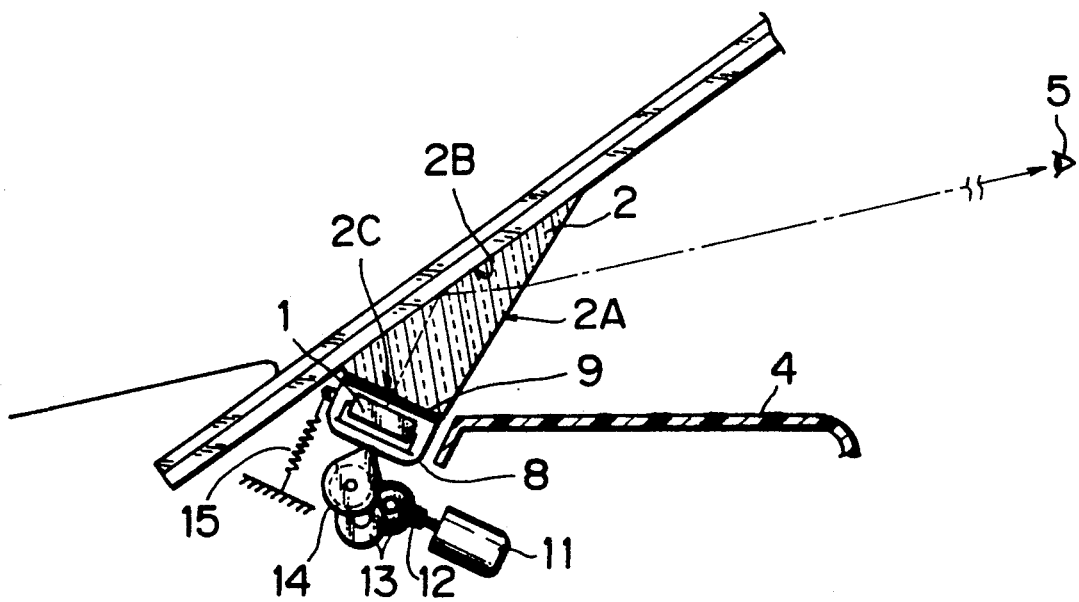
FIG. 4 is a schematic diagram showing an automotive display apparatus as a third embodiment of this invention.

FIG. 4 shows a third embodiment of the automotive display apparatus according to this invention. An indicator 1 of this embodiment is contained in a case 8, which has, on the display surface side of the indicator 1, a black plate 9 that is cut out in the display pattern area of the indicator 1. The case 8 is movable toward and away from the prism 2 so that the black plate 9 can be brought into contact with the third surface 2C of the prism 2 and retracted away from that surface. Mounted in the dashboard 4 is a motor 11 whose drive shaft is rigidly fitted with a pinion 12. The pinion 12 is in mesh with reduction gears 13, which are connected to a cam 14 whose sliding surface is in contact with the underside of the indicator 1. The case 8 is supported slidable in a direction perpendicular to the display surface by a member not shown and is also urged by a spring 15 toward the cam 14.

Figure 5A:
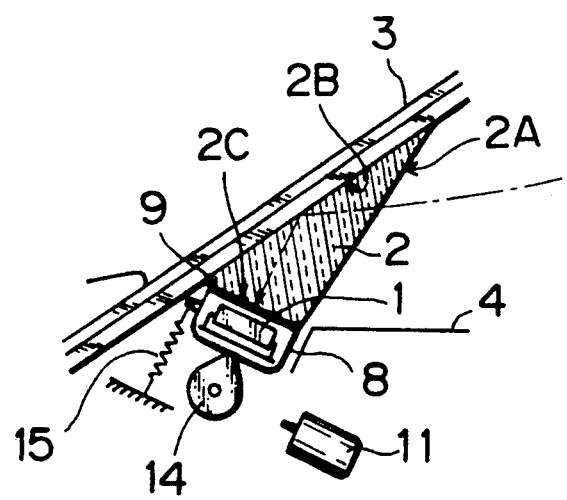
FIGS. 5a and 5b are schematic diagrams showing different conditions in which the third embodiment is operated.

As the motor 11 is started, it rotates the cam 14 through the pinion 12 and reduction gears 13. The case 8 is reciprocally moved either to a position of FIG. 5a or to the position of FIG. 5b as the cam 14 is rotated. The reciprocal motion of the case 8 causes the black plate 9 in front of the indicator 1 either to come into contact with the third surface 2C of the prism 2 or to part from it.

Figure 5B:
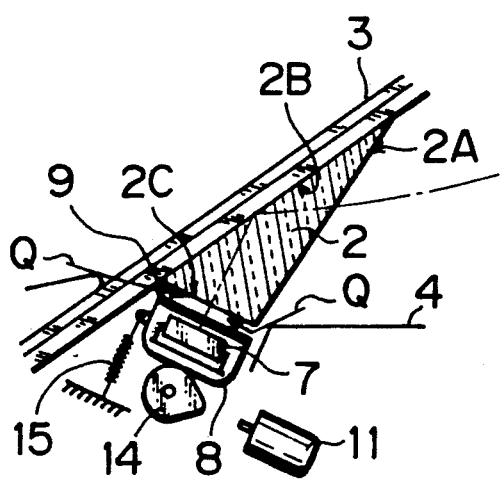
Figure 6:
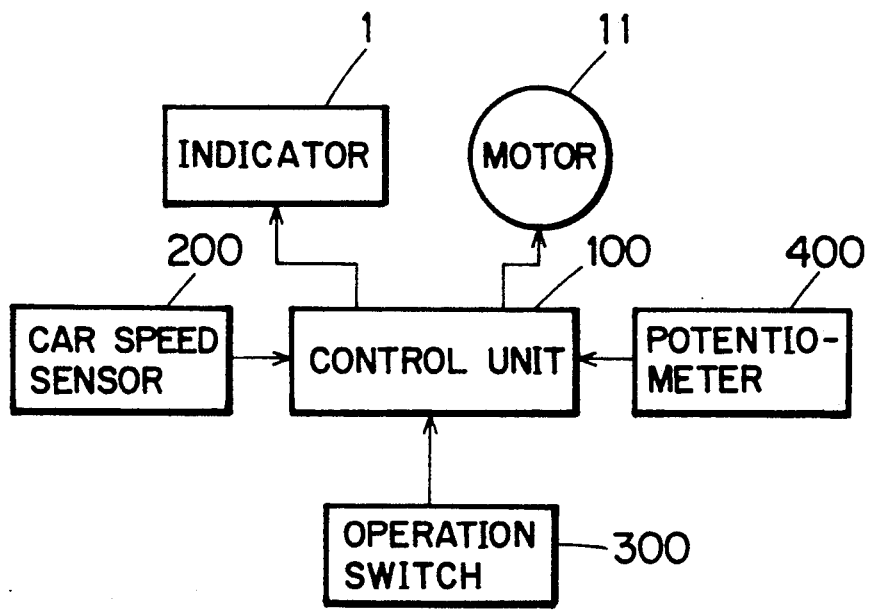
FIG. 6 is a block diagram of the third embodiment.
Figure 8A:
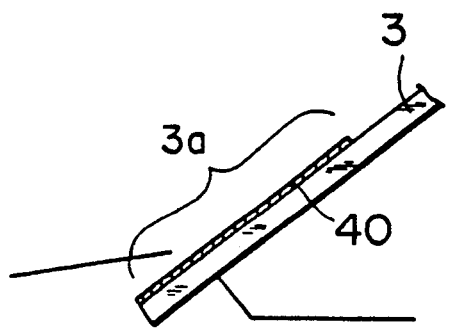
FIGS. 8a and 8b are schematic views showing different types of the conventional display apparatus.
Figure 8B:
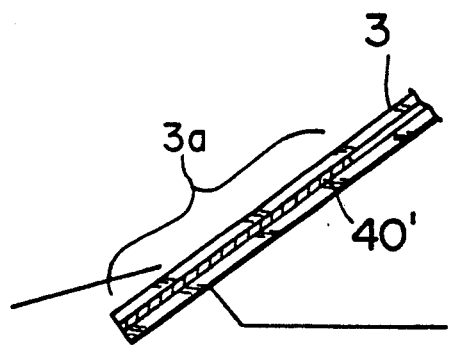

FIG. 6 shows a block diagram of the third embodiment. In the figure, a control unit 100 consists of a microcomputer, a drive circuit to drive the motor 11, and a display drive circuit. The control unit 100 is connected with a car speed sensor 200, an operation switch 300 arranged on the dashboard 4, and a potentiometer 400 to detect the rotating position of the cam 14. When the operation switch 300 is turned on, the control unit 100 drives the motor 11 while monitoring the potentiometer 400 to move the case 8 to the position of FIG. 5a in order to display the car speed detected by the car speed sensor 200 on the indicator 1. When the operation switch 300 is turned off, the control unit 100 similarly drives the motor 11 to move the case 8 to the position of FIG. 5b to stop displaying the car speed from the indicator 1.

In this way, this embodiment allows selection by the operation switch between the two positions, one for display and one for no display. In the no display condition, external light Q enters into the prism 2 through the third surface 2C, as shown in FIG. 5b, so that the third surface 2C becomes nearly as bright as the first and second surfaces 2A, 2B. This prevents the dark area (black plate 9) from being observed on the windshield 3, clearing the windshield of a distracting or annoying object for a driver.

As in the first and second embodiments, the prism 2 is transparent when seen from outside the vehicle, so that it does not mar the external appearance of the windshield. Moreover, since the prism 2 is a separate member from the windshield 3, the manufacture can be carried out without restrictions and maintenance performed easily.

The construction and features of this invention may be summarized as follows.

A prism, whose first and second surfaces join at the apex of the prism cross section and function as reflecting surfaces for an display image, is arranged at a lower part of the windshield with the prism apex inclined toward the driver's seat so as to reflect the display image of the indicator in the dashboard by the first or second surface of the prism toward the driver's seat. The third surface of the prism is provided with a dark layer. The second surface of the prism works as a total reflection surface for light from the third surface with respect to the viewing point of a driver, so that the display image of the indicator, which is seen by the driver at the second surface of the prism at a lower part of the viewing field of windshield, has a dark background of the third surface that is reflected by the second surface. When viewed from outside the windshield, the prism appears transparent. This means that the display apparatus of this invention forms a head-up display with high contrast thanks to the dark background and also maintains the good external appearance of the windshield because no dark reflecting portion, found in conventional apparatuses, is used. Still another advantage is that since the prism is a separate member from the windshield, manufacture can be done without any restriction and maintenance carried out with ease.

What is claimed is:

1. An automotive display apparatus, comprising:
   an indicator having a display surface, said indicator being installed in a dashboard of an automobile such that said display surface faces upwardly; and
   a prism having a first surface disposed facing a driver's seat side of said automobile, and a second surface held in contact with an inner side of a windshield of said automobile, said first and second surfaces being joined at a cross-sectional apex of the prism, said prism being installed at a lower part of a viewing field of the windshield near the dashboard such that the prism apex is inclined toward the driver's seat side, wherein a display image of the indicator is reflected by one of said first and second surfaces of the prism toward the driver's seat side, said prism further having a third surface provided with a dark plane, said prism being disposed such that said second surface totally reflects light from the third surface toward a viewing point on the driver's seat side.

2. An automotive display apparatus as claimed in claim 1, wherein said indicator is positioned below the first surface of the prism so that the display image of the indicator can be reflected by the first surface toward the driver seat side, and the second total reflection surface reflects light from the third dark surface of the prism toward the driver's seat to provide a dark background for the display.

3. An automotive display apparatus as claimed in claim 1, wherein said indicator is positioned immediately below the third surface of the prism.

4. An automotive display apparatus as claimed in claim 3, wherein said dark plane is formed over the third surface of the prism other than an area corresponding to a display pattern of the indicator that the display image light of the indicator can pass through the dark plane onto the second surface of the prism and that the display image reflected by the second surface appears illuminating out of the surrounding dark area.

5. An automotive display apparatus as claimed in claim 4, wherein said indicator is positioned immediately below the third surface of the prism in such a way that it can be moved toward and away from the third surface, so that the display image can be made to appear or disappear from the prism surface.

6. An automotive display apparatus as claimed in claim 5, wherein said dark plane is attached to a container of the indicator.

7. An automotive display apparatus as claimed in claim 1, in which the prism, when viewed from outside the windshield, appears transparent.

* * * * *